United States Patent [19]

Wollam

[11] 4,037,945
[45] July 26, 1977

[54] INDIRECT REFLECTIVE WINDOW

[76] Inventor: John S. Wollam, 53 Alcott St., Acton, Mass. 01720

[21] Appl. No.: 564,157

[22] Filed: Apr. 1, 1975

[51] Int. Cl.² .............................................. G02B 5/00
[52] U.S. Cl. .................................. 350/319; 350/299; 118/49
[58] Field of Search ............... 350/319, 299, 301, 286, 350/262–265; 118/9, 49; 109/58.5

[56] References Cited

U.S. PATENT DOCUMENTS

| 721,259 | 2/1903 | Wadsworth | 350/262 |
| 749,761 | 1/1904 | Wadsworth | 350/262 |
| 2,398,799 | 4/1946 | Miller | 350/319 X |
| 3,453,039 | 7/1969 | Osborne | 350/263 X |
| 3,620,604 | 11/1971 | Benham | 350/301 |
| 3,753,822 | 8/1973 | Heinrich | 350/301 |

FOREIGN PATENT DOCUMENTS

| 951,521 | 4/1949 | France | 350/301 |
| 1,380,637 | 6/1964 | France | 350/301 |

Primary Examiner—John K. Corbin
Assistant Examiner—B. W. delos Reyes
Attorney, Agent, or Firm—Joseph S. Iandiorio

[57] ABSTRACT

A reflective window for providing an indirect optical path to an object including an array having a plurality of reflective elements, each being disposed at an acute angle to the plane of the window and parallel to each of the other reflective elements; each of the reflective elements having a length, along its dimension which intersects with the plane of the window, capable of producing on the window a projection which is at least as great as the distance between each pair of the reflective elements, each of the reflective elements having first and second reflective surfaces for receiving radiation on its first reflective surface and reflecting it to the second reflective surface of one adjacent reflective element and for receiving on and reflecting from its second surface radiation from the first reflective surface of another adjacent reflective element.

6 Claims, 4 Drawing Figures

INDIRECT REFLECTIVE WINDOW

FIELD OF INVENTION

This invention relates to an improved, compact reflective window for providing an indirect optical path to an object, and more particularly to such a window for use in a deposition chamber to prevent deposits from interfering with the viewing of the chamber interior.

BACKGROUND OF INVENTION

It is often necessary to obtain a full view of an object or otherwise establish an optical path to a point without using a direct optical path. For example, an indirect optical path is useful to enable viewing of a radioactive substance by means of visible radiation while at the same time providing a protective screen or block against radiation which is not reflected such as alpha, beta or gamma rays. Another example relates to a deposition chamber where the window, used to view the deposition operation and the object on which the deposition is being made, quickly becomes covered by the deposition action so that the view is blocked. Prior art attempts to circumvent this problem have either used a blocking member to place the viewing window in the shadow of the depositing source or used mirrors in a periscope arrangement. The periscope arrangement relies on the fact that the deposition improves, not detracts from the reflective properties of the mirrors. However, both of these approaches have serious shortcomings. Only a limited number of positions are available from which to make observations. The reflecting and blocking elements require specific placement to afford the proper view and have appreciable size; both considerations diminish the effective utilization of the space within the chamber. The viewing angle is quite narrow and the viewing positions are limited so that a comprehensive view of the entire chamber and contents is difficult to obtain. Illumination of the chamber interior through a periscope arrangement cannot satisfactorily be done simultaneously with viewing the interior.

SUMMARY OF THE INVENTION

It is therefore an object of this invention to provide an improved, compact reflective window for providing an indirect optical path.

It is a further object of this invention to provide such a window which provides a wide field of view from a plurality of positions.

It is a further object of this invention to provide such a window which enables simultaneous viewing and illumination and which provides a large viewing area in a minimum of space.

The invention results from the realization that a blocked or protected indirect viewing window can be created from a plurality of relatively small, parallel, closely spaced reflective elements which give a broad unrestricted field of view from a wide range of viewing positions with minimum interference with the operation and structure of associated devices.

This invention features a reflective window for providing an indirect optical path to an object. The window includes an array having a plurality of reflective elements each disposed at an acute angle to the plane of the window and parallel to each other. Each of the reflective elements has a length, along its dimensions which intersects with the plane of the window, capable of producing on the window a projection which is at least as great as the distance between each pair of the reflective elements. Each of the reflective elements has first and second reflective surfaces for receiving radiation on the first surface and reflecting it to the second reflective surface of a neighboring reflective element and for receiving on and reflecting from the second surface radiation from the first reflective surface of another neighboring reflective element.

In preferred embodiments the invention features a wide angle reflective indirect viewing window located in a deposition chamber, to prevent deposits occurring in the chamber from interfering with the viewing of the chamber interior. The reflective elements may be initially transparent and adapted to receive a reflective coating during the deposition process to provide the reflective surfaces.

DISCLOSURE OF PREFERRED EMBODIMENT

Other objects, features and advantages will occur from the following description of a preferred embodiment and the accompanying drawings, in which.

Figure 1:
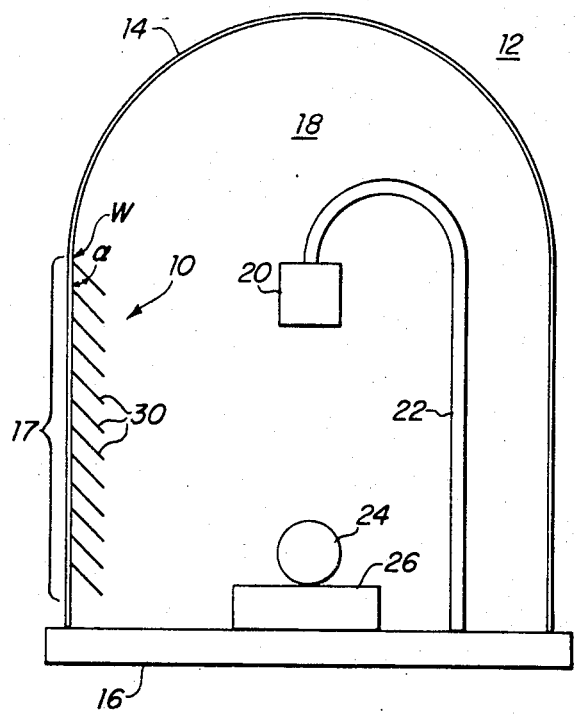
FIG. 1 is a schematized, front view of a deposition chamber employing the window of this invention.

Window 10, FIG. 1, may be used in a deposition chamber 12 comprising a glass bell jar 14 sealingly engaged with a base 16. Within the volume 18 enclosed by bell jar 14 is a source of metal vapor 20 suitably positioned on a support 22 to provide metal vapors for deposit on the work piece 24 disposed on support 26. Window 10 includes a plurality of reflector elements 30 arranged at an acute angle $a$, typically 45° to the plane W of window 10, which acts to screen or shield an area 17 from vapor deposition.

Figure 2:
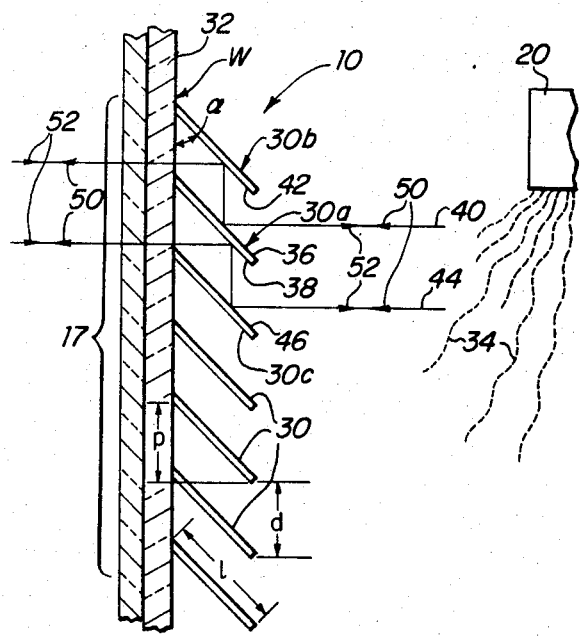
FIG. 2 is an enlarged view of a portion of the window of FIG. 1.

As shown in more detail in FIG. 2, reflector elements 30 are parallel to each other and are arranged so that the distance $p$ of the projection of their length $l$ is equal to or greater than the distance $d$ between them. This ensures that there can be no direct line from the source to the area 17 screened or shielded by window 10. Elements 30 may be mounted directly on the glass bell jar 14 in the area 17 as shown in FIG. 1 or on a separate transparent mounting member 32 as shown in FIG. 2.

The arrangement of elements 30 prevents access to the area 17 by any metal deposits derived from metal vapors 34 from source 20 or any other radiations or emanations which are incapable of reflection, such as alpha, beta or gamma rays given off by radioactive substances. However, visible radiation and other emanations which are capable of reflection find an indirect optical path through window 10, through the functioning of elements 30. Element 30, as typified by element 30a, includes a first reflective surface 36 and a second reflective surface 38; radiation 40 striking first surface 36 of element 30a is reflected upwardly and is again reflected from the second reflecting surface 42 of element 30b and then out through the area 17. Similarly, radiation 44 strikes the first surface 46 of element 30c and then is again reflected off the second surface 38 of element 30a and then out through area 17. Thus while certain radiations and emanations ae prevented from passing through window 10, other radiations and emanations which are reflectable from elements 30 pass through window 10 in an indirect path. The desired radiation 40, 44 may be travelling from the interior in the direction shown by arrows 50 as in the case of this embodiment where the observer seeks to view the interior of the deposition chamber or may be directed in the other direction shown by arrows 52 when it is desired to illuminate an object within the chamber on the other side of the window or radiation may be passing in both directions. The ability to pass radiation in both directions simultaneously i.e. to illuminate the interior of the chamber and at the same time view it through the same window is useful when the bell jar or other housing is opaque or the chamber interior is dark for any reason.

Initially elements 30 have been referred to as reflector elements e.g. mirrors having two reflective surfaces. However, when used in a deposition chamber such as described herein they may be installed initially as transparent elements which after a short period of operation in the deposition chamber will have received a sufficient amount of metal depositions on their first surfaces, i.e. the surfaces 36 and 46 of elements 30a and 30c to make the elements into mirrors. The second surfaces such as 38 and 42 on elements 30a and 30b are provided by the underside of these depositions accessed through the transparent material of the element. In the event that the initial installation uses mirrors in a deposition chamber the subsequent operation of the deposition chamber will merely add to the reflective material on the elements and will now prevent the effective operation of the window.

Figure 3:
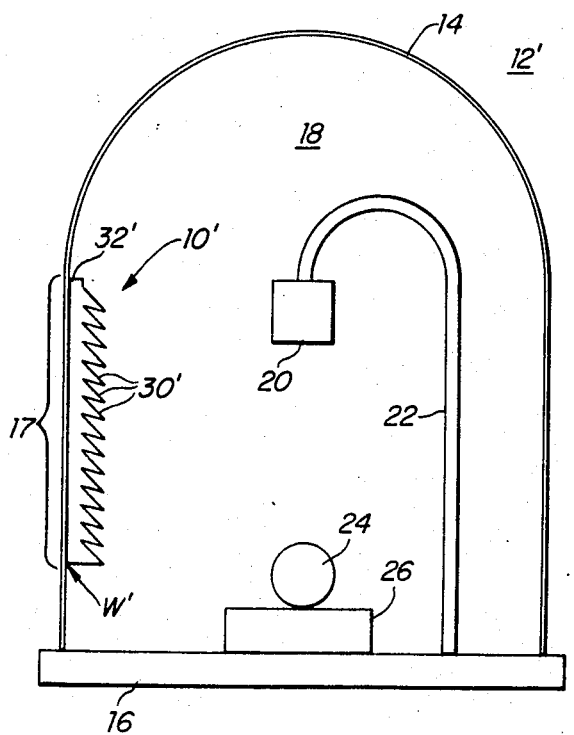
FIG. 3 is a view similar to FIG. 1 showing a window having a different construction.
Figure 4:
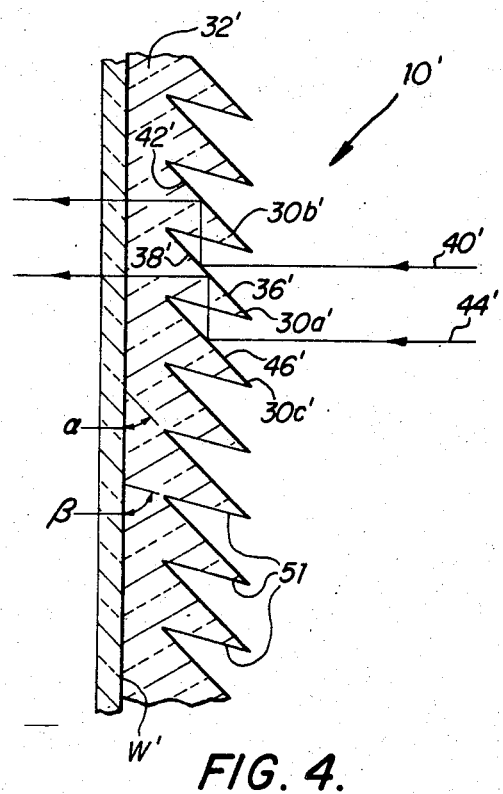
FIG. 4 is an enlarged view of a portion of the window of FIG. 3.

Alternatively, as shown in FIG. 3 where like parts have been given like numbers and similar parts like numbers primed, window 10' may be constructed with reflector elements 30' integrally formed and in combination with support 32'. The material of which window 10' is formed is transparent so that the two reflector surfaces are provided on each element 30' as typified by element 30a', FIG. 4, having a first surface 36' on the exposed portion of element 30a' and a second reflecting surface 38' on the internal side of element 30a'. Neighboring elements 30b' and 30c' having a second surace 42' and first surface 46' function, as explained in relation to FIGS. 1 and 2, to provide an indirect reflective path for radiation 40' and 44' through window 10'. Typically, as shown in FIGS. 3 and 4, elements 30' are maintained at an acute angle, typically 45°, and the interconnecting elements 51 are at a larger acute angle $\beta$ or even orthogonal to the plane W' of window 10'. If the interconnecting elements 51 are not strictly orthogonal to the plane W' of the window 10', but instead also make an acute ange $\beta$, where $\beta > \alpha$, there is less likelihood that elements 51 will become filmed over and thus render the whole assembly opaque and useless. This could happen in some processes where the vapor pressure is high, or other appreciable gas pressure makes the path of the metal atoms other than line-of-sight such as in a sputtering chamber. Elements 30' may be initially prepared as reflectors or mirrors or if they are being used in a deposition chamber the deposition of the metal in such a chamber may be relied upon to provide the necessary reflecting film.

Other embodiments will occur to those skilled in the art and are within the following claims.

What is claimed is:

1. An indirect reflective viewing window for use in a metal-film deposition chamber for providing an unobstructed, indirect, clear and undistorted wide area view of the interior of the chamber and for preventing metal-film deposits from interfering with the reflective viewing of the chamber interior, comprising:
   mounting means for attaching to the inside transparent portion of the chamber wall; and
   an array carried by said mounting means on the inside of the chamber and including more than two planar reflective elements, each being disposed at an acute first angle to the plane of the window and parallel to each other; each of said reflective elements extending downwardly toward the base of the chamber in overlapping relationship to prevent deposits from forming on the area of the inside surface of the chamber where they are mounted, each of said reflective elements having first and second reflective surfaces for receiving radiation on its first said reflective surface and reflecting it to the second surface of one adjacent said reflective element and for receiving on and reflecting from its said second surface radiation from the first reflective surface of another adjacent reflective element, so that said radiation may then exit the chamber on a path parallel to the incident radiation.

2. The window of claim 1 in which said window is formed as an integral unit and includes a plurality of intermediate elements arranged one formed from a transparent material and said intermediate element interconnecting each adjacent pair of said reflective elements.

3. The window of claim 2 in which said transparent elements have second parallel planar surfaces which are disposed at a second angle to the plane of said window, said second angle being greater than said first angle and not more than 90°.

4. The window of claim 3 in which said second angle is a right angle.

5. The window of claim 1 in which said first angle is approximately 45 degrees.

6. The window of claim 1 in which said reflective elements are initially transparent.

* * * * *